United States Patent [19]
Fleenor

[11] 3,892,088
[45] July 1, 1975

[54] DOOR MOUNTING FOR CARGO HANDLING MECHANISM

[76] Inventor: Warren O. Fleenor, 8250 W. Bergen Rd., Leroy, N.Y. 14482

[22] Filed: May 3, 1973

[21] Appl. No.: 356,767

[52] U.S. Cl. ............... 49/37; 49/252; 105/368 R; 102/436; 182/38; 182/141; 214/85
[51] Int. Cl. ............................................. B60p 1/00
[58] Field of Search ......... 214/505, 85, 75 R, 75 T; 105/436, 368 R; 14/71; 182/36, 38, 82, 141; 49/246, 252362, 37; 296/57 R, 58, 61, 62, 146

[56] References Cited
UNITED STATES PATENTS

| | | | |
|---|---|---|---|
| 502,510 | 8/1893 | Dorn | 214/85 |
| 874,525 | 12/1907 | McGranor et al. | 214/75 T |
| 1,380,229 | 5/1921 | Manheim | 214/85 |
| 1,526,621 | 2/1925 | Zaun | 214/75 T |
| 2,824,659 | 2/1958 | Erlinder | 214/75 T |
| 3,063,747 | 11/1962 | Anderson | 296/57 |
| 3,313,376 | 4/1967 | Holland | 182/141 |
| 3,420,570 | 1/1969 | Kunz | 296/100 |
| 3,462,786 | 8/1969 | Olsson | 14/71 |

FOREIGN PATENTS OR APPLICATIONS

| | | | |
|---|---|---|---|
| 79,906 | 3/1919 | Switzerland | 105/436 |

Primary Examiner—Robert J. Spar
Assistant Examiner—Donald W. Underwood

[57] ABSTRACT

An improved door mounting for the door of a cargo-handling mechanism of the type adapted to load cargo into and unload cargo from an enclosing structure, such as a railroad car or the like. The cargo-handling mechanism defines a cargo passage opening, and is preferably mounted in vertical orientation for lateral movement for horizontally aligning the opening with a desired cargo space in the enclosing structure. The door mounting of the cargo-handling mechanism supports the door for pivotal movement about a vertically movable fulcrum between an open position, in which the door forms a platform over which cargo may be loaded into or unloaded from the enclosing structure, and a closed position, in which the opening is closed or blocked. The door mounting is further vertically movable relative to the cargo-handling mechanism for aligning the lower end of the door with a desired elevation level in the enclosing structure.

13 Claims, 5 Drawing Figures

DOOR MOUNTING FOR CARGO HANDLING MECHANISM

BACKGROUND OF THE INVENTION

1. Field of the Invention

This invention relates generally to material handling equipment, and more specifically to an improved door mounting for a cargo-handling mechanism.

2. Description of the Prior Art

A cargo-handling mechanism for loading cargo into or unloading cargo from an enclosing structure is known in the art of which U.S. Pat. No. 3,368,704 is exemplary. In such a mechanism, a support frame defining a cargo passage opening is mountable on an open side of the enclosing structure, and movable laterally in a horizontal direction for aligning the opening with the desired portion of the cargo space in the enclosing structure. The support frame slidably supports an elevator frame for vertical movement, and the elevator frame supports a door for pivotal movement about stub shafts on the door journaled in bearings on the elevator frame. In such door mounting means, no means are provided for imparting pivotal movement to the door, such mounting merely providing a pivot about which the door is manually moved. In U.S. Pat. No. 3,794,193 by this same inventor, a powered door mounting means is disclosed. In such door mounting means, a large diameter ring gear is mounted on the elevator frame which is engaged by a driven pinion gear on the door. One of the disadvantages of this powered door mounting means is that some of the mounting parts thereof and support parts such as the elevator frame are unduly large, bulky and heavy requiring increased power for moving the door between its open and closed positions. This also results in increased problems in handling and storing the cargo handling mechanism.

SUMMARY OF THE INVENTION

This invention includes within its scope an improved door mounting means for a cargo-handling mechanism for moving the door between open and closed positions. In a preferred embodiment of the invention, the mechanism comprises a support frame defining a cargo passage opening, a door in the opening movable between open and closed positions, and door mounting means on the support frame for slidably supporting the rear end of the door and providing a vertically movable fulcrum about which the door is pivoted between its open and closed positions. In a further embodiment of the invention, the door mounting means comprises a gear rack on the support frame, a pinion gear rotatably supported by the rear end of the door, and means for holding the pinion gear into meshing engagement with the gear rack. The pinion is rotatably driven by a power source mounted within the door.

It is accordingly one of the objects and advantages of the present invention to provide an improved door mounting means for a cargo-handling mechanism.

Another object and advantage of the invention is to provide an improved door mounting means for a cargo-handling mechanism that is of simple design and construction, thoroughly reliable and efficient in operation, and economical to manufacture.

Another object and advantage of the invention is to provide an improved door mounting means for a cargo-handling mechanism that reduces the size, weight and bulkiness of the mechanism, and its ease of handling and storage.

The invention and its objects and advantages will become more apparent from the detailed description of the preferred embodiments presented below.

BRIEF DESCRIPTION OF THE DRAWINGS

In the detailed description of the preferred embodiment of the invention below, reference is made to the accompanying drawings, in which.

DESCRIPTION OF THE PREFERRED EMBODIMENT

Because cargo-handling mechanisms are well known, the present description will be directed in particular to elements forming part of, or cooperating more directly with, the present invention. Elements of cargo-handling mechanisms not specifically shown or described herein should be understood to be selectable from those known in the art.

Figure 1:
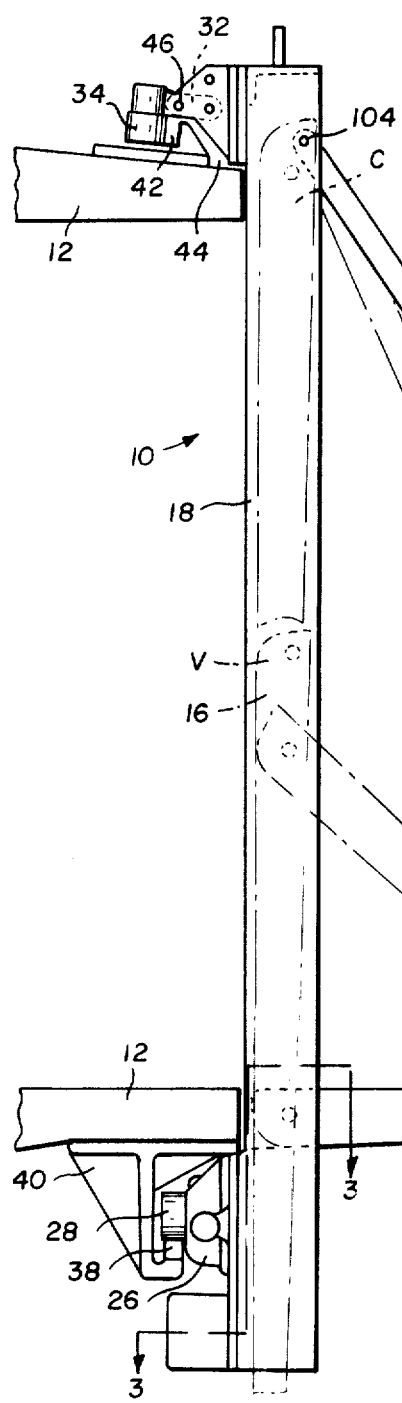
FIG. 1 is a side elevational view of a cargo-handling mechanism in which a preferred embodiment of the door mounting means of this invention is embodied.
Figure 2:
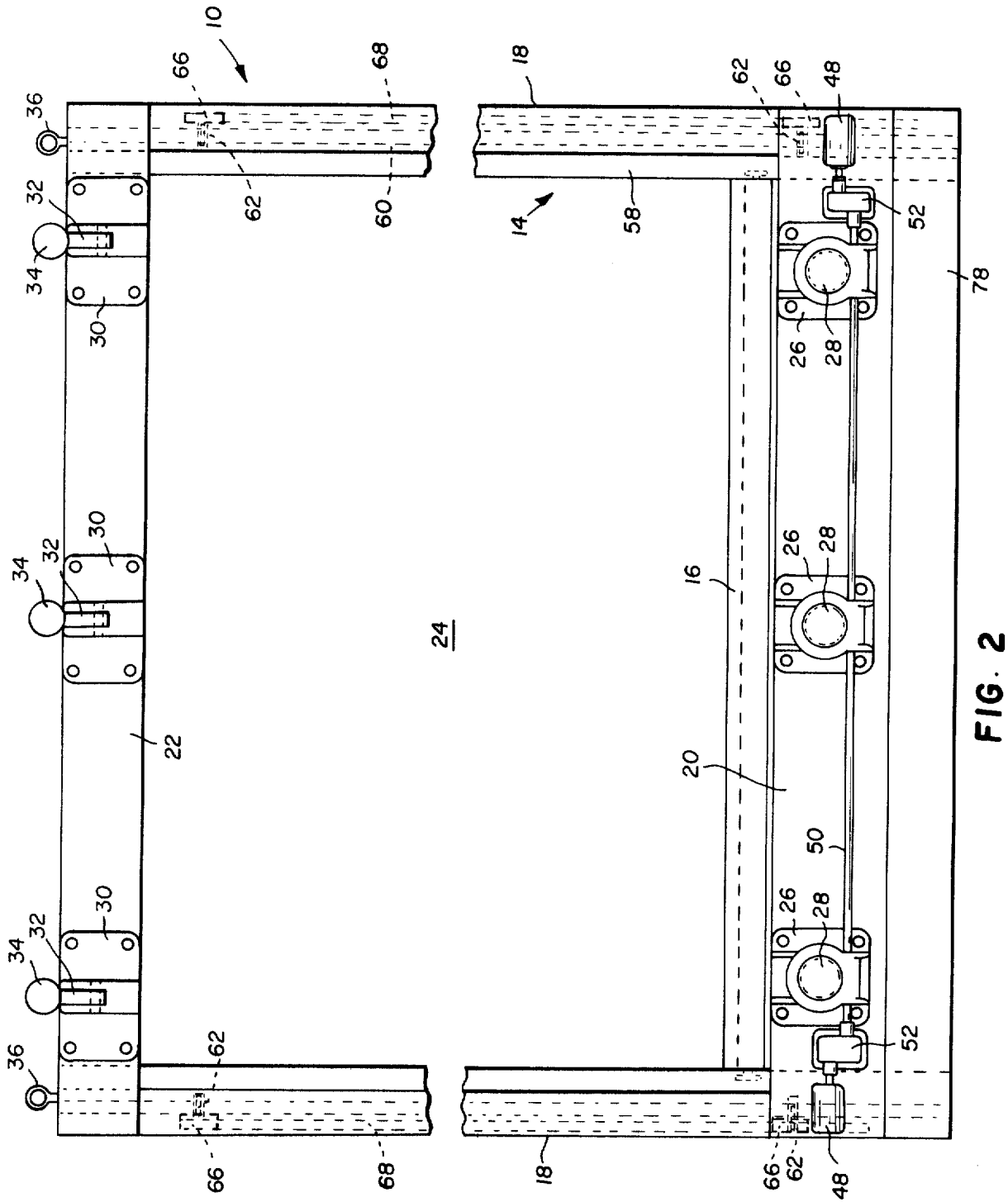
FIG. 2 is a rear elevational view of the cargo-handling mechanism of FIG. 1.

With reference to the drawings, particularly FIGS. 1 and 2, a preferred embodiment of the door mounting means of this invention is incorporated in a cargo-handling mechanism essentially comprising a support frame 10 mountable on an enclosing structure 12 and laterally movable in a horizontal direction relative to a cargo access opening therein, an elevator frame 14 slidably supported by support frame 10 and vertically movable up or down, and a door 16 supported by elevator frame 14 for movement between open and closed positions.

Figure 3:
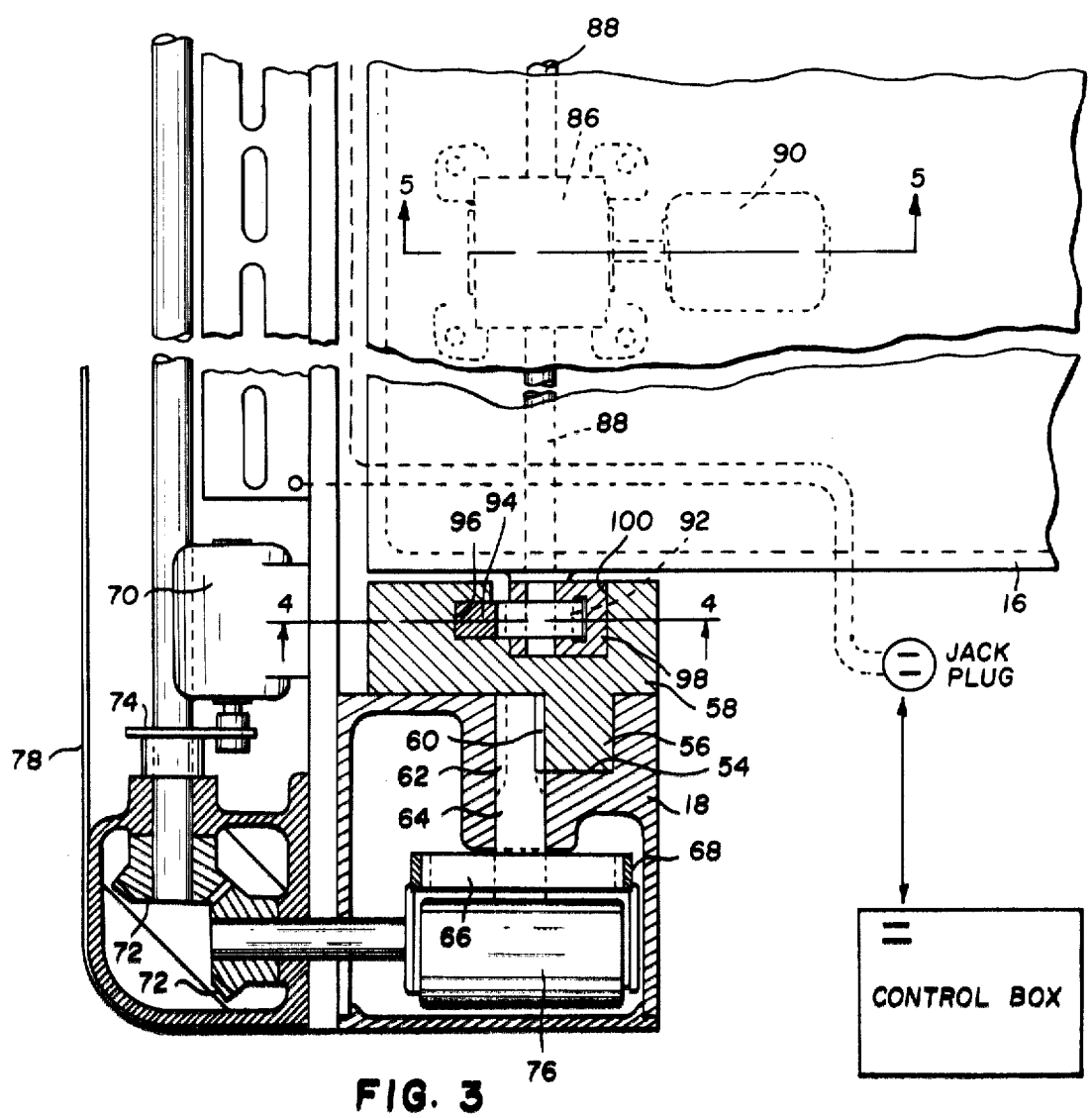
FIG. 3 is a segmental view in section taken substantially along line 3—3 of FIG. 1.

The support frame 10 (FIG. 2) comprises a pair of spaced side posts 18 secured together at the top and bottom by a pair of cross members 20, 22 respectively to define a central cargo passage opening 24. The lower cross member 20 has a plurality of housings 26 secured thereto for supporting stub shafts to which transport rollers 28 are secured. The upper cross member has a plurality of brackets 30 secured thereto, each adapted to pivotally support an arm 32 which, in turn, rotatably supports a transversely extending shaft to which rollers 34 are secured. The support frame 10 may be lifted by any suitable means (such as a crane having a cable-hook for engaging eyelets 36 on the upper member) and mounted on a railroad car 12 or the like with the lower rollers 28 resting on a lower rail 38 secured by brackets 40 to railroad car 12. The upper rollers 34 are moved from a retracted position to a locked position, causing rollers 34 to engage the rear side of an upper rail 42, also secured to the car by brackets 44 or the like. The upper roller 34 may be held in its locked and retracted positions by any suitable detent, such as a retractable bolt 46 on bracket 30 engageable with an opening in arm 32. The mounted support frame 10 is laterally movable on rails 38, 42 by battery-powered drive motors 48 on lower member 20 coupled to rollers 28 by any suitable drive shaft 50 and gears 52. When motors 48 are actuated by any twoway switch or the like, a battery is electrically connected to the motors for driving the motors in the proper direction for driving rollers in a selected direction of rotation for laterally moving support frame 10 on the rails in either direction. The posts 18 of support frame 10 are provided on their inner sides with grooves 54 (FIG. 3) extending from one end to the other to form guideways for slidably receiving complimentary elongated ribs 56 extending from rectangular elevator frame 14, now to be described.

The elevator frame 14 which is slidably supported by support frame 10, comprises spaced side posts 58 connected at the top and bottom by upper and lower cross members, not shown. The aforementioned ribs 56 are secured to the outer sides of side post 58, and one side of each rib 56 is provided with gear teeth to form a gear rack 60. The elevator frame 14 is vertically moved up or down by a plurality of pinion gears 62 on shaft 64 in meshing engagement with gear racks 60. Sprockets 66 are mounted on shafts 64 and drivingly coupled to endless chains 68 trained over the sprockets. Each chain 68 is driven by a battery-powered drive motor 70 coupled to one of the sprockets 66 by any suitable drive train, such as a plurality of intermeshing sears 72, belt 74, gear box 76 and the like. The drive motors 70 and drive train are covered by a semi-cylindrical shield 78. Accordingly, when drive motors 70 are energized for operation in either direction of rotation by any suitable throw-switch or the like suitably mounted on support frame 10, gear racks 60 are driven by gears 62 in either direction for moving elevator frame 14 up or down relative to support frame 10. Although ribs 56 are on the side posts 58 and grooves 54 are on the inside members 18, it is, of course, within the scope of the invention to reverse the position of the ribs and grooves.

Figure 4:
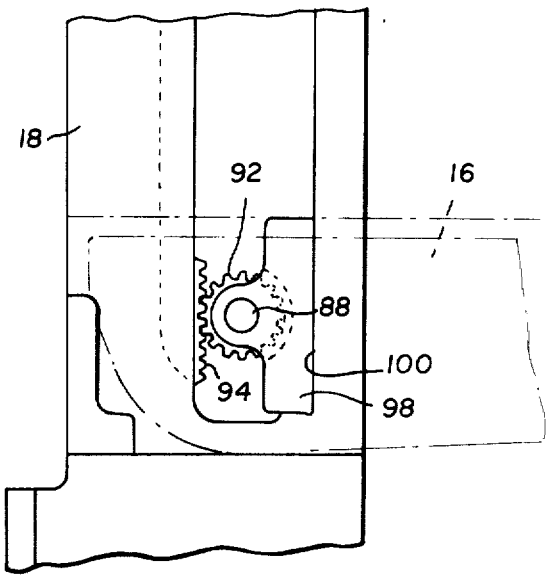
FIG. 4 is a segmental view in section taken substantially along line 4—4 of FIG. 3.
Figure 5:
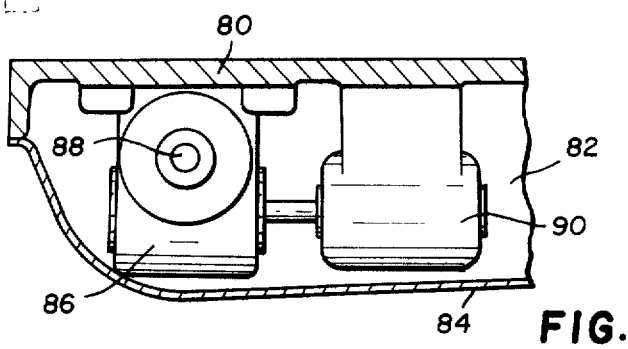
FIG. 5 is a segmental view in section taken substantially along line 5—5 of FIG. 3.

The improved door mounting means of this invention for mounting the substantially rectangular door 16 to elevator frame 14 will now be described. The door is movable by the mounting means between a closed position, in which the door closes or blocks the cargo passage opening 24 defined by the elevator frame, and an open position as seen in FIGS. 1 and 2 in which it provides a platform over which cargo may be transported through opening 24. The door 16 (FIGS. 3 and 5) comprises a substantially rigid upper plate 80 over which the cargo is moved, depending side plates 82 and a bottom cover plate 84 of sheet metal or the like to form an enclosure within the door. A gear box of any suitable type is mounted within the enclosure and secured to plate 80. The gear box 86 has laterally extending stub shafts 88 extending through openings in side plates 82 and driven by any suitable battery-operated drive motor 90, also secured to upper plate 80. A gear 92 is secured to each of the laterally extending ends of stub shafts 88, and each gear 92 is in meshing engagement with corresponding gear teeth on a rack 94 (FIGS. 2–4) mounted within a vertically extending elongated slot 96 in side post 58. Each pinion gear 92 is held in meshing engagement with its corresponding rack 94 by a shoe 98 (FIGS. 3 and 4) of U-shaped cross section in which the walls of the shoe form a bearing for portions of stub shaft 88 on each side of pinion gear 92. Each shoe 98 is slidably movable within an elongated guideway 100 in side post 58. Accordingly, operation of battery-operated motor 90 in either direction of rotation causes stub shafts 88 and pinion gears 92 to rotate for vertically moving the rear end of door 16 either up or down depending upon the direction of rotation of the motor. In the open position of the door, as best illustrated in FIG. 1, pinion gear 92 is rotated relative to stationary gear rack 94 in a proper direction to move the rear end of door 16 to its lowermost position in which shoes 98 are in engagement with the lower ends of guideways 100. To maintain door 16 in a substantially level position, support rods 102 are provided having one end pivotally secured to side post 58 at 104 and the opposite end pivotally secured at 106 to side plate 82 of door 16 adjacent the front end thereof. The support rod connection 106 at the door may be releasable to disconnect the front end of the door and allow it to be lowered from the horizontal position in the event a slight downward incline is desired for loading or unloading purposes. When the loading or unloading operation has been completed, and it is desired to move door 16 to its closed position, motor 90 is again operated causing gears 92 to climb up the rack 94 raising the rear end of door 16 as indicated by broken lines in FIG. 1. As the rear end of door 16 is raised vertically, the front end swings downwardly at the end of support rods 102, such swinging action continuing until the door is in a vertical position designated "V" in FIG. 1. At such time, continued movement of gears 92 raises door 16 vertically to its fully closed position designated "C". During such latter movement, support rods 102 must shorten, and to accommodate such action, the support rods comprise two telescoping portions 108, 110 in which lower portion 110 has a laterally extending pin 112 at one end thereof movable within an elongated slot 114 in upper portion 108.

For safety purposes, the electrical control system for motors 48, 70 and 90 comprises a battery power supply preferably carried by support frame 10 and connected by a jack plug (FIG. 3) to a control box preferably carried by the cargo handling mechanism. The control box is provided with the necessary electrical leads and switches for alternately electrically connecting the power supply to the afornentioned motors or to a power take-off motor, not shown, carried by the door. The jack plug can be disconnected from the control box and inserted in a jack receptacle, not shown, for electrically connecting the power supply to the generator of the prime mover for operating the prime mover and charging the batteries. Accordingly, with this electrical control system, the prime mover moving the car or vehicle cannot be operated while cargo is being unloaded or loaded by the cargo handling mechanism, and when the prime mover is operated, the cargo handling mechanism cannot be operated.

The invention has been described in detail with particular reference to a preferred embodiment thereof, but it will be understood that variations and modifications can be effected within the spirit and scope of the invention as described hereinabove.

I claim:

1. In a cargo handling mechanism, the combination comprising:
   support frame means defining an opening;
   a door movable between open and closed positions for opening and closing said opening, and having a front end and a rear end;

means for movably mounting said rear end of said door to said support frame means adjacent one end of said opening;

said door mounting means comprising a guideway in said support frame means, a gear rack in said guideway, a spindle on said rear end of said door, a pinion gear on said spindle, and a shoe pivotally mounted on said spindle and slidably mounted in said guideway for holding said pinion gear into meshing engagement with said gear rack; and means for driving said spindle and said pinion gear for reciprocally moving said rear end of said door relative to said support frame means for moving said door between said open and closed positions.

2. In a cargo handling mechanism, the combination comprising:

support frame means defining an opening;

a door movable between open and closed positions for opening and closing said opening, and having a front end and a rear end;

means for movably mounting said rear end of said door to said support frame means adjacent one end of said opening;

said door mounting means comprising spaced apart guideways on said support frame means, one on each side of said opening, a gear rack in each of said guideways, laterally extending spaced apart spindles on said rear end of said door, a pinion gear on each of said spindles, and a shoe pivotally mounted on each of said spindles and slidably supported by a corresponding one of said guideways for guiding and holding said corresponding pinion gear into meshing engagement with a corresponding one of said gear racks; and means for driving said spindles and said pinion gears for reciprocally moving said rear end of said door relative to said support frame means for moving said door between said open and closed positions.

3. The invention according to claim 1, and further comprising a support rod having one end pivotally connected to said front end of said door, and the opposite end of said support rod pivotally connected to said support frame means.

4. The invention according to claim 3 wherein said support rod is telescopable.

5. The invention according to claim 1, and further comprising means for supporting said front end of said door.

6. The invention according to claim 5 wherein said supporting means comprises a support rod having one end pivotally connected to said front end of said door, and the opposite end of said support rod pivotally connected to said support frame means.

7. The invention according to claim 6 wherein said support rod is telescopable.

8. The invention according to claim 1 wherein said cargo handling mechanism is mounted on the side of a vehicle, and further comprising a telescopable support rod having one end pivotally connected to said front end of said door, and the opposite end pivotally connected to said support frame means.

9. The invention according to claim 2, and further comprising means for supporting said front end of said door.

10. The invention according to claim 9 wherein said supporting means comprises a support rod having one end pivotally connected to said front end of said door, and the opposite end of said support rod pivotally connected to said support frame means.

11. The invention according to claim 10 wherein said support rod is telescopable.

12. The invention according to claim 2 wherein said cargo handling mechanism is mounted on the side of a vehicle, and further comprising a telescopable support rod having one end pivotally connected to said front end of said door, and the opposite end pivotally connected to said support frame means.

13. In a cargo handling mechanism for a vehicle such as a railroad car, the combination comprising:

support frame means defining an opening in a side of said vehicle having a lower and an upper end, and further defining a guideway extending between said lower and upper ends;

a door movable between open and closed positions for fully opening and closing said opening, and having a front end and a rear end;

a telescopable support rod for supporting said front end of said door and having one end pivotally connected to said front end of said door, and the opposite end of said support rod pivotally connected to said support frame means adjacent said upper end of said opening, said ends of said support rod being movable toward and away from one another upon movement of said door between its open and closed positions respectively;

means for movably mounting said rear end of said door on said guideway of said support frame means; and power means for reciprocally moving said rear end of said door relative to said guideway of said support frame means between said lower and upper ends of said opening for moving said door between said open and closed positions while said front end thereof is supported by said support rod.

* * * * *